United States Patent
Cordle et al.

(10) Patent No.: US 9,911,561 B2
(45) Date of Patent: Mar. 6, 2018

(54) SOLENOID CURRENT CONTROL WITH FAULT DETECTION, OVERRIDE, AND SHUTDOWN FEATURES

(71) Applicant: Target Rock Division of Curtiss-Wright Flow Control Corporation, East Farmingdale, NY (US)

(72) Inventors: Kevin Gerard Cordle, Miller Place, NY (US); John Behm, Syosset, NY (US)

(73) Assignee: TARGET ROCK DIVISION OF CURTISS-WRIGHT FLOW CONTROL CORPORATION, East Farmingdale, NY (US)

( * ) Notice: Subject to any disclaimer, the term of this patent is extended or adjusted under 35 U.S.C. 154(b) by 215 days.

(21) Appl. No.: 14/941,077

(22) Filed: Nov. 13, 2015

(65) Prior Publication Data

US 2017/0140888 A1    May 18, 2017

(51) Int. Cl.
*H01H 9/00*    (2006.01)
*H01H 47/32*    (2006.01)
*H01H 47/00*    (2006.01)
*H02H 3/087*    (2006.01)
*F02D 41/20*    (2006.01)

(52) U.S. Cl.
CPC .......... *H01H 47/32* (2013.01); *H01H 47/325* (2013.01); *F02D 41/20* (2013.01); *H01H 47/002* (2013.01); *H02H 3/087* (2013.01)

(58) Field of Classification Search
USPC ........................................ 361/139, 144, 160
See application file for complete search history.

(56) References Cited

U.S. PATENT DOCUMENTS

| | | | |
|---|---|---|---|
| 4,812,945 A * | 3/1989 | D'Onofrio | H01H 47/22 361/154 |
| 5,293,551 A | 3/1994 | Perkins et al. | |
| 6,062,496 A | 5/2000 | Kinter | |
| 6,262,874 B1 * | 7/2001 | Stoll | G05F 1/56 361/160 |
| 6,394,415 B1 | 5/2002 | Ohmi et al. | |
| 6,545,852 B1 | 4/2003 | Arnold | |
| 6,759,640 B2 | 7/2004 | Yoeda et al. | |
| 6,889,121 B1 | 5/2005 | Shahroudi et al. | |
| 7,178,704 B2 | 2/2007 | Saidman | |
| 7,782,590 B2 | 8/2010 | Bedingfield et al. | |
| 8,320,096 B2 | 11/2012 | Harnett | |
| 8,542,006 B2 | 9/2013 | Liu | |
| 2007/0053133 A1 | 3/2007 | Evans | |
| 2013/0021713 A1 * | 1/2013 | Choi | H01H 47/325 361/160 |

* cited by examiner

*Primary Examiner* — Danny Nguyen
(74) *Attorney, Agent, or Firm* — Hoffman & Baron, LLP

(57) ABSTRACT

A DC solenoid coil current controller includes a rectifier, pulse width modulator, and power driver. The rectifier inputs an alternating current signal and a direct current signal, and outputs a rectified signal using at least one of the alternating current signal and the direct current signal. The pulse width modulator outputs a pulse width modulated signal in response to the rectified signal. The power driver controls a DC solenoid coil using the pulse width modulated signal, thereby enabling a direct current DC solenoid coil to be controlled in response to the alternating current signal. A method of controlling current to a DC solenoid coil is also disclosed.

21 Claims, 5 Drawing Sheets

Current Indicator:
Yel- full current mode
Grn- control current mode
None: fault

SOLENOID CURRENT CONTROL WITH FAULT DETECTION, OVERRIDE, AND SHUTDOWN FEATURES

BACKGROUND

Field

The disclosed embodiments relate to DC solenoid coils, such as that used in conjunction with solenoid operated valves (SOV). More particularly, the disclosed embodiments relate to a control device that fully actuates a DC solenoid coil using either an alternating current (AC) power source or a direct current (DC) power source.

Related Art

Conventional devices developed to control DC solenoid coils associated with solenoid operated valves (SOV) can only accept one of an alternating current (AC) power source or a direct current (DC) power source, but not both, without being physically modified. For example, conventional devices do not permit DC solenoid coils to be driven from an AC source, or AC solenoid coils to be driven by a DC source without performing hardware modifications to the driving devices. This requirement makes it far more difficult to use the DC solenoid coil under various operating conditions.

SUMMARY

The embodiments disclosed herein include a DC solenoid coil current controller, which includes a rectifier, pulse width modulator, and power driver. The rectifier is configured to input an alternating current signal, input a direct current signal, and output a rectified signal using at least one of the alternating current signal and the direct current signal. The pulse width modulator is configured to output a pulse width modulated signal in response to the rectified signal. The power driver is configured to control a DC solenoid coil using the pulse width modulated signal, thereby enabling a direct current DC solenoid coil to be controlled in response to the alternating current signal.

The DC solenoid coil current controller may include pre-regulation circuitry configured to input the rectified signal, which has a first voltage. The pre-regulation circuitry may convert the rectified signal to a pre-regulated signal having a second voltage, which is less than the first voltage. The DC solenoid coil current controller may include voltage regulation circuitry configured to input the pre-regulated signal and convert the pre-regulated signal to a regulated signal having a third voltage. The second voltage may be greater than the third voltage. The pre-regulation circuitry may include at least one of an insulated gate bipolar transistor, a diode, a resistor, and a capacitor. The alternating current signal may include a voltage range of 80-135 VAC, and the direct current signal may include a voltage range of 90-140 VDC. The pre-regulated signal may include a voltage of 40V, and the regulated signal may include a voltage of 12 VDC. The DC solenoid coil current controller may include fault detection circuitry configured to detect at least one of a failure to energize the DC solenoid coil to an expected full current value, loss of current control, incorrect DC solenoid coil connected to the DC solenoid coil current controller, shorted DC solenoid coil winding, and loss of power.

The embodiments disclosed herein further include a method of controlling current to a DC solenoid coil, which includes inputting an alternating current signal and a direct current signal, rectifying at least one of the alternating current signal and the direct current signal to provide a rectified signal, providing a pulse width modulated signal in response to the rectified signal, and controlling a DC solenoid coil using the pulse width modulated signal, thereby enabling a direct current DC solenoid coil to be controlled in response to the alternating current signal.

The method may also include converting the rectified signal to a pre-regulated signal having a second voltage that is less than a first voltage of the rectified signal. The method may include converting the pre-regulated signal to a regulated signal having a third voltage, which is less than the second voltage of the pre-regulated signal. The alternating current signal may include a voltage range of 80-135 VAC, and the direct current signal may include a voltage range of 90-140 VDC. The pre-regulated signal may include a voltage of 40V, and the regulated signal may include a voltage of 12 VDC. The method may include detecting at least one of a failure to energize the DC solenoid coil to an expected full current value, loss of current control, incorrect DC solenoid coil connected to the DC solenoid coil current controller, shorted DC solenoid coil winding, and loss of power.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein.

Figure 1:
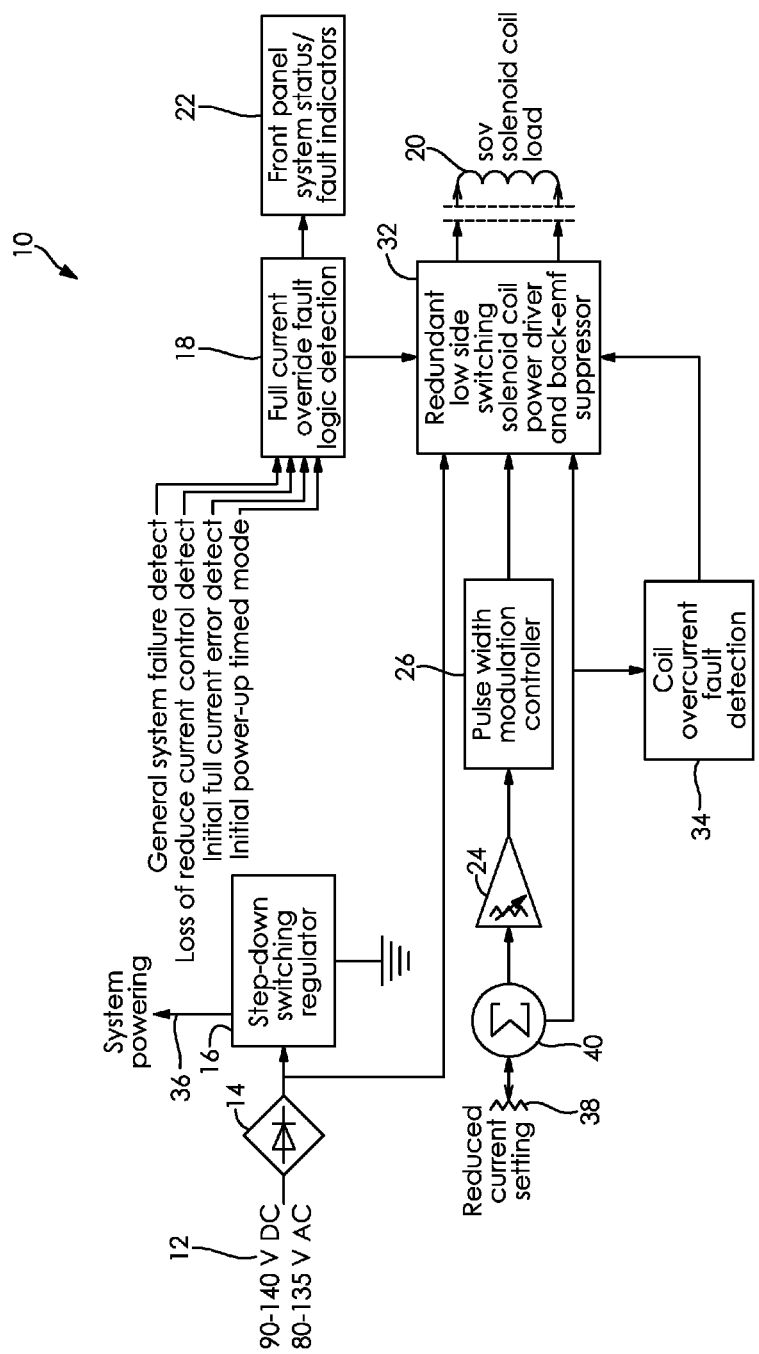
FIG. 1 is a block diagram showing a control device that controls a DC solenoid coil that may be associated with a solenoid operated valve (SOV)

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

Direct current (DC) solenoid operated valves are not conventionally driven by an alternating current (AC) power source. However, embodiments of a current control device disclosed herein fully actuate a DC solenoid coil, such as a DC solenoid coil associated with a solenoid operated valve (SOV), using either an AC power source or a DC power source. These features enable the current control device to be used as a universal front-end converter for DC solenoid coil control. Embodiments of the current control device are able to drive DC solenoid coils with resistances ranging from, for example, 36 ohms to 250 ohms. The current control device reduces power requirements and heat dissipation of the DC solenoid coil by reducing a level of current used to operate the DC solenoid coil. This reduced level of coil current is maintained over environmental and operating conditions of the SOV, thereby maintaining wattage and self-heating of the DC solenoid coil at a reduced level. In addition, the current control device monitors system conditions and provides appropriate corrective actions in response to fault conditions that are detected.

The current control device is a proportional loop current feedback controller system that takes advantage of a difference between the level of current used to actuate the SOV using the DC solenoid coil, which is referred to herein as a pull-in current level, and the reduced level of current used to hold the SOV in an actuated state, which is referred to herein as a hold-in current level.

The current control device is also a dynamic control loop system that utilizes current feedback to first apply the pull-in current level to the DC solenoid coil in order to fully actuate the valve. Following a delay, the current applied to the DC solenoid coil is reduced to the hold-in current level. This delay can last for approximately sixty (60) to ninety (90) seconds. However, it is to be understood that this delay may be of a different duration while remaining within the scope of the disclosed subject matter. The delay, which occurs during a full-power state, is used to ensure that the SOV is fully actuated in a pull-in state before changing the SOV to a hold-in state.

The hold-in current level for SOVs is set at approximately 50-60% of a typical full current of the DC solenoid coil associated with the SOV which is, for example, 0.4 to 4.0 amps. However, it is to be understood that the hold-in current level may be set at a different level while remaining within the scope of the disclosed subject matter. Following the pull-in state, the current control device automatically reduces the current applied to the DC solenoid coil to the hold-in current level. The hold-in current level is maintained until the system is reset, which is performed by removing power from the current control device followed by re-applying power to the current control device.

By providing a reduced current level to the DC solenoid coil, the current control device reduces the heat that collects in the DC solenoid coil while being energized. This reduction in heat build-up in the DC solenoid coil is proportional to an approximately 40% reduction in electrical current, which is measured in amps, and also electrical power, which is measured in watts, that is generated as heat in the windings of the DC solenoid coil.

FIG. 1 shows a block diagram of an embodiment of the current control device 10. The current control device 10 can accept either an AC, such as 80-135 VAC at 50-60 Hz, or a DC, such as 90-140 VDC, voltage input 12 and drive a DC solenoid coil having, for example, a 36-250 ohm resistance. The voltage input 12 is applied to a full wave bridge rectifier 14, which rectifies the AC voltage input 12. The output of the full-wave bridge rectifier 14 is applied to a step-down switching regulator 16.

The step-down switching regulator circuit 16 includes a linear step-down pre-regulator and a high-efficiency Buck switching regulator (not shown in FIG. 1). An output of the linear step-down pre-regulator is applied to the Buck switching regulator. The Buck switching regulator outputs a low-voltage DC signal 36 that provides power to the current control device 10 at various voltage levels.

The current control device 10 also includes an analog fault detection circuit 18 that monitors out-of-bound conditions, system faults, and modes, and provides a full current override control signal to a power driver 32, and various additional driving signals to status/fault indicators 22. The status/fault indicators 22 provide visual indications of the mode or fault condition associated with the current control device 10, which include a general system failure, a loss of reduced current control, an initial full current error, and an initial power-up timed mode. Depending on the state or fault detected, the current control device 10 either proceeds to an override bypass mode or an output shutdown mode.

In the override bypass mode, a full input voltage of the current control device 10 is applied to the DC solenoid coil 20 without current feedback control. One purpose of the override bypass mode is to ensure that the DC solenoid coil 20 is energized in the event of an uncertain state of the current control device 10 and DC solenoid coil 20 combination, such as an incorrect alignment in which the current control device 10 has been configured using an incorrect coil specification, an incorrect coil connected to the current control device 10 in which the current control device 10 is being used to power a DC solenoid coil for which the current control device 10 was not initially aligned to work with, and/or a current control device failure. Typically, the current control device 10 is factory aligned to efficiently power a specific model of DC solenoid coil, that is, the current control device 10 has been optimized to work with a specific DC solenoid coil and valve. If the current control device 10 detects that the current control device 10 is powering a DC solenoid coil other than the DC solenoid coil that the current control device 10 was aligned to work with, the current control device 10 enters bypass mode and applies full power to the DC solenoid coil since the current control device 10 no longer knows what the hold-in current level should be for the DC solenoid coil. In output shutdown mode, the output of the current control device 10 to the DC solenoid coil 20 is turned off to prevent failure of the current control device 10 and overheating of the DC solenoid coil 20.

Table 1 below summarizes the fault conditions and how the current control device 10 responds to each of these fault conditions.

TABLE 1

| Fault Condition | Current Control Device Response |
| --- | --- |
| Failure to energize to expected DC solenoid coil full current value | Bypass Mode |
| Loss of current control beyond a +25% tolerance window of reduced current mode setting. The detection of a loss of current control condition may be the result of either a current control device failure, an open or shorted wiring connection to the coil, or a shorted or open coil condition. | Bypass Mode |
| Incorrect DC solenoid coil connected to current control device. The current control device utilizes a window comparator circuit that detects conditions outside of a window. In this case, an upper window boundary of the current control is set to 125% above an expected current control value. A lower window boundary is set to 75% of the expected current control value. This enables the current control device to detect whether the current control device is connected to the correct DC solenoid coil. Anything other than the correct DC solenoid coil will cause the current to fall outside the window, thereby triggering the current control device to enter the bypass mode. The +/−25% window tolerance is configurable. The expected current control value is configured in accordance with the expected DC solenoid coil. | Bypass mode |

TABLE 1-continued

| Fault Condition | Current Control Device Response |
|---|---|
| Shorted DC solenoid coil winding | Shutdown Mode |
| General current control device failure including loss of power. The general current control device failure represents a failure in either the full wave bridge rectifier or step-down switching regulator shown in FIG. 1. If the current control device fails completely, the current control device automatically enters the bypass mode. Thus, a total failure of the current control device will still allow power to be applied to the DC solenoid coil, but there will be no hold-in current functionality since the current control device is inoperable. Accordingly, use of the current control device with the solenoid valve will not impact valve operation under any scenario. Specifically, if the current control device works, the current control device will extend the operating life of the DC solenoid coil due to reduced heating effects, and if the current control device fails, then the system operates as if the current control device were not present. | Bypass Mode |

A panel of the current control device housing includes two bi-color light emitting diode (LED) indicators 22, which are labeled "Operational Mode" and "Output Current Mode". These indicators are used to visually display a current operational mode or output current mode state of the current control device 10. Table 2 below lists a visual state of each LED indicator 22 in accordance with each of the modes.

TABLE 2

| Current Control Device State | Operational Mode Indicator | Current Mode Indicator |
|---|---|---|
| Normal Operation/Full Current Override Mode | Green | Yellow |
| Normal Operation/Reduced Current Mode | Green | Green |
| Fault Condition/Bypass Mode | Red | No illumination |
| Fault Condition/Shutdown Mode | Blinking Red | No illumination |

The current control device 10 controls current to the DC solenoid coil 20 by varying an average voltage to the DC solenoid coil 20 using a proportional loop gain amplifier 24 and pulse width modulation controller 26. The reduced current level setting is selected using a potentiometer 38, the output of which is provided to a summing junction 40. The summing junction 40 adds the reduced current level setting to a coil current value, and outputs the result to the proportional loop gain amplifier 24. The coil current value is fed back from power driver 32 to the summer 40, which uses the coil current value to maintain an appropriate hold-in current. An output of the proportional loop gain amplifier 24 is applied to the pulse width modulation controller 26, the output of which is applied to the power driver 32. The power driver 32 also receives the rectified input voltage from the full-wave bridge rectifier 14. Controlling the DC solenoid coil 20 voltage maintains a constant current to the DC solenoid coil 20 under varying conditions of input voltage, DC solenoid coil temperature, and ambient temperature. The average voltage applied to the DC solenoid coil 20 is varied using pulse width modulation, which converts an input voltage to variable-width pulses at a fixed frequency.

The output of the current control device 10 is a square wave with a frequency in a kilohertz range, and a peak voltage that is approximately equal to the voltage input 12 to the current control device 10. Controlling voltage to the DC solenoid coil 20 is implemented by varying the duty cycle of the square wave output to the DC solenoid coil 20 between 0 and 100%. Since the DC solenoid coil 20 has a large inductance, current to the DC solenoid coil 20 is equal to the percent on-time of the square wave multiplied by the voltage input 12 applied to the current control device divided by the DC resistance of the DC solenoid coil 20, which is represented by equation (1) as follows:

$$I_{coil} = [\text{percent on-time} * R_{coil}] \quad (1).$$

Figure 3:
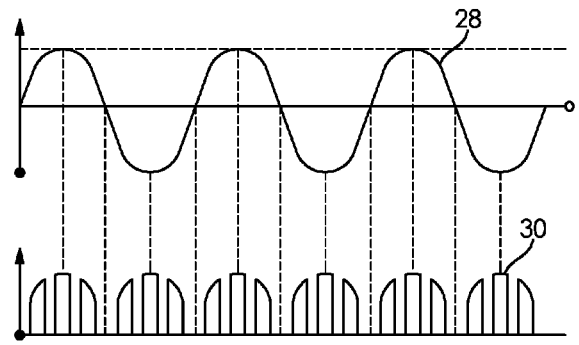
FIG. 3 shows input and output voltage waveforms of the control device shown in FIG. 1.

If the voltage input 12 is applied as an AC signal 28, the full-wave output voltage signal 30 is pulse-width modulated as shown in FIG. 3.

The power driver 32 is coupled to a latching coil overcurrent fault detection circuit 34, and is a low-side switching, high-current metal oxide semiconductor field effect transistor (MOSFET) driver circuit capable of driving the DC solenoid coil 20 with up to 5 amps of continuous current. The MOSFET driver circuit 32 utilizes redundant MOSFET devices and incorporates back electromotive force (EMF) suppression circuitry.

Output MOSFETS associated with the power driver 32 are protected from an overcurrent condition in the DC solenoid coil 20 by the latching coil overcurrent fault detection circuit 34, which is tripped in response to the coil current of the DC solenoid coil 20 being greater than 5 amps. The latching coil overcurrent fault detection circuit 34 is a latching circuit that shuts off the pulse width modulation controller 26. Once the latching coil overcurrent fault detection circuit 34 is tripped, the pulse width modulation controller 26 remains off until power to the current control device 10 is reset by first removing power and then reapplying power to the current control device 10.

When the current control device 10 is connected to the DC solenoid coil 20, the following sequence of events occurs. Following application of the AC or DC input voltage 12 to the current control device 10, the output of the current control device 10 is approximately equal to the DC value of the input voltage 12. This full-voltage output condition lasts, for example, for 60-90 seconds after power is initially supplied. This period of time is referred to herein as a full-power interval.

During the full-power interval, the current in the DC solenoid coil 20 is compared to an expected set value in the current control device 10. If the actual value of the current in the DC solenoid coil 20 and the expected current value match, within a nominal tolerance, the current control device 10 sets a full-current detection circuit in the pulse width modulation circuit 26 to indicate a successful full-power startup sequence. The status/fault indicators 22 are then lit in accordance with Table 2 above. If the full-current detection circuit is not set, then full current was not achieved and the current control device 10 enters the bypass mode. Full current detection may fail for the following reasons:

an incorrect DC solenoid coil 20 was connected to the current control device 10;

the DC solenoid coil 20 failed to open because, for example, DC resistance of the DC solenoid coil is high due to damaged magnetic and/or lead wire connections; and/or an electrical connection between the DC solenoid coil 20 and the current control device 10 is open or improperly connected.

At the end of the full-power interval, the current control device 10 enters the hold-in current mode or reduced-current mode. The reduced current mode is monitored by a window comparator circuit that continuously monitors the reduced-current value and compares the reduced-current value to the expected reduced current value within a nominal tolerance. If at any time the reduced coil current is above or below the expected reduced current value, the current control device 10 enters the bypass mode. The reduced current value may be out of its expected range if, for example, the resistance of the DC solenoid coil 20 has changed from its expected value, thus being either higher or lower depending on the failure mode of the DC solenoid coil. The bypass mode ensures that if resistance of the DC solenoid coil 20 increases beyond its expected value, the current control device 10 will maintain the hold-in current until the DC solenoid coil 20 fails completely. The fault/status indicator lights 22 are then lit in accordance with Table 2 above.

During both the full-power interval and the reduced-current mode, the current control device 10 monitors the current to the DC solenoid coil to detect an overcurrent condition of greater than 5 amps. If this current is greater than 5 amps, the current control device 10 enters the shutdown mode and the indicator lights 22 are lit according to Table 2 above.

If the current control device 10 fails, the current control device 10 enters the bypass mode to ensure that the DC solenoid coil 20 maintains the hold-in state. Depending on the failure mode of the current control device 10, the status/fault indicators 22 may or may not be lit.

A fail condition detected by the window comparator typically forces the current control device into the bypass mode, unless greater than 5 A of coil current is detected. The overcurrent fault detection circuit 34 overrides other functions and shuts down the current control device output.

Thus, the current control device 10 incorporates the following features:
- a DC solenoid coil 20 that can be driven using either a DC or AC voltage source;
- a substantial reduction in heat dissipation in the DC solenoid coil by maintaining a constant reduced current following the pull-in period, during which constant current equates to constant power dissipation in the DC solenoid coil over its rated operational parameters;
- combining current and wattage reductions with fault detection circuitry and coil operating mode correction to ensure continuous operability of the DC solenoid coil over a range of environmental and operational parameters;
- the DC solenoid coil continues to operate even if the current control device fails; and
- status/fault indicators provide the operator with a visual indication of current control device operation, and thus an indication of the condition of the DC solenoid coil 20, which can be used as part of a maintenance program for the SOV.

Figure 2A:
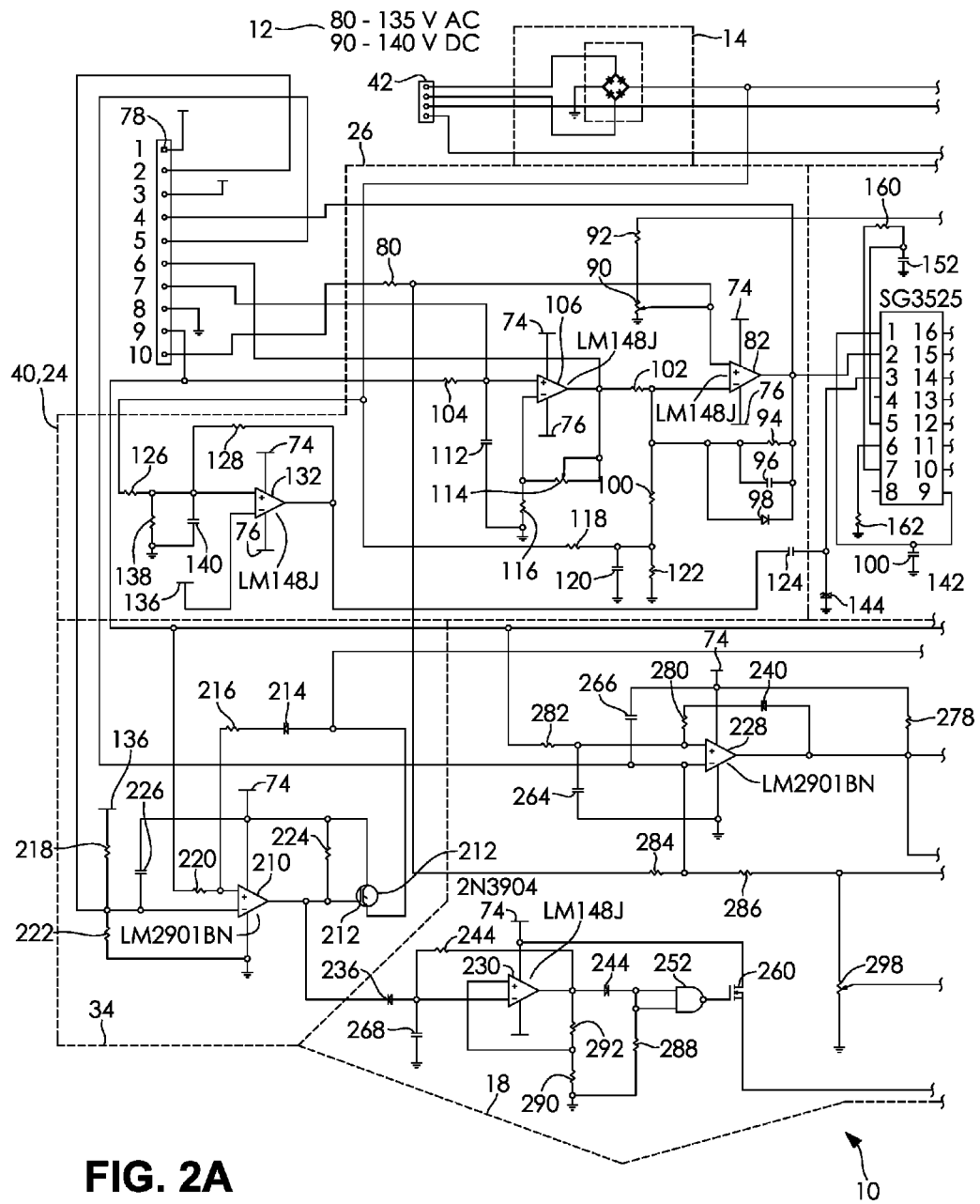
FIGS. 2A-C are schematic diagrams of the control device shown in FIG. 1.
Figure 2B:
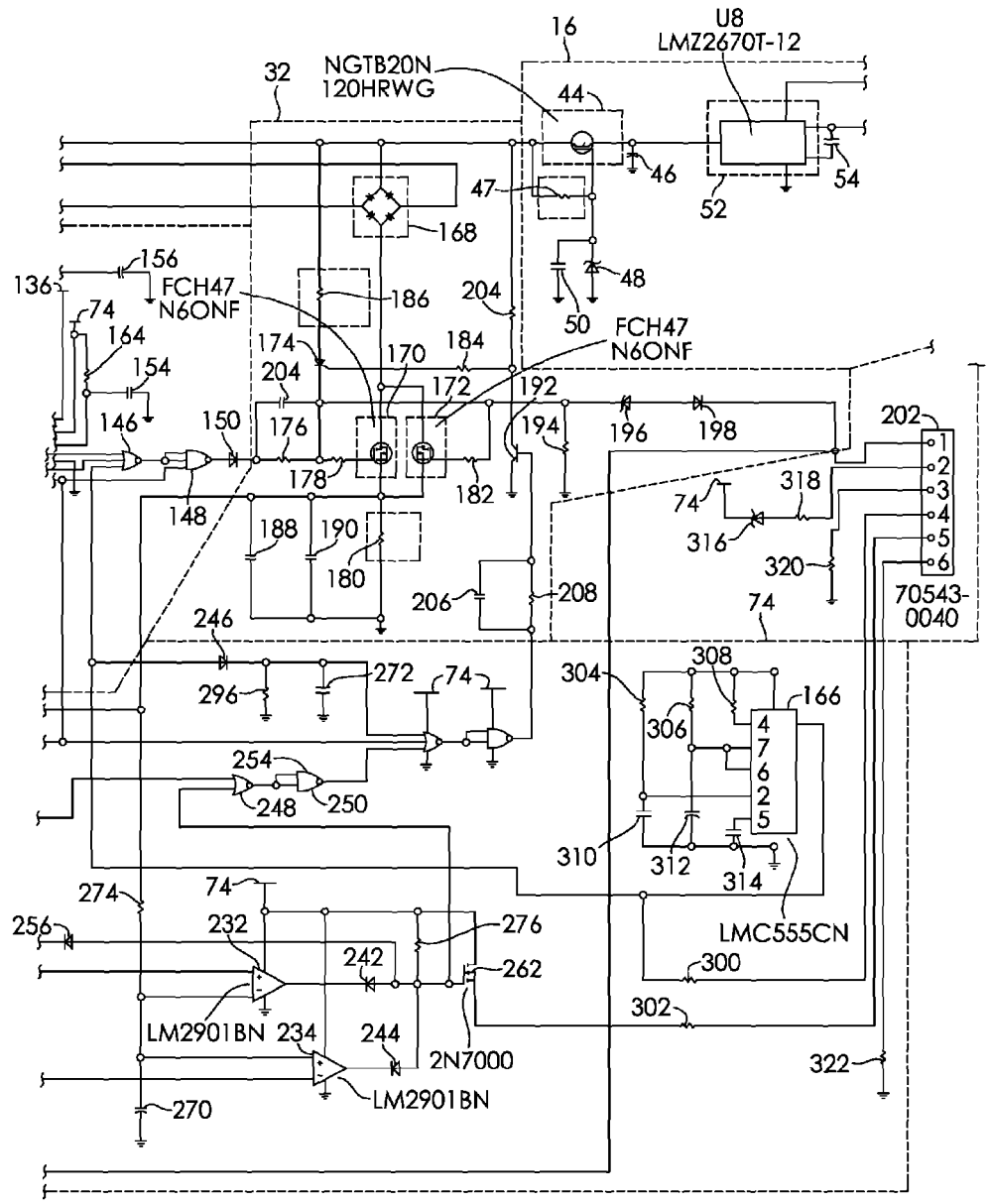
Figure 2C:
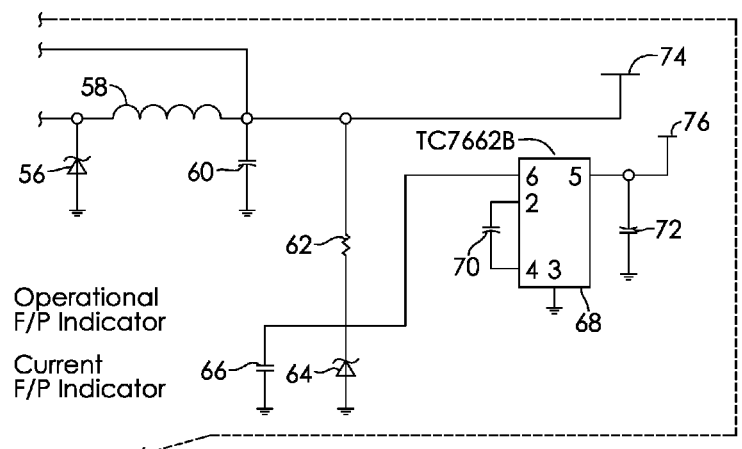

FIGS. 2A-C are schematic diagrams of an embodiment of the current control device 10 shown in FIG. 1. The input voltage 12 is applied to a connector 42, which provides the applied input voltage 12 to the bridge rectifier 14. A positive input voltage is applied to input terminal 2 of the bridge rectifier 14, and a negative input voltage is applied to terminal 3 of the bridge rectifier 14. Terminal 4 of the bridge rectifier 14 is coupled to ground, and terminal 1 of the bridge rectifier 14 is applied to the step-down switching regulator 16, which includes a field effect transistor (FET) 44; capacitors 46, 50, 54, 60, 66, 70, 72; Zener diodes 48, 56, 64; resistors 47, 62; step-down voltage regulator 52; inductor 58; and DC-to-DC voltage convertor 68.

Terminal 1 of the bridge rectifier 14 is coupled to a source terminal of insulated gate bipolar transistor 44, which is coupled to a gate terminal of transistor 44 through resistor 47. The gate terminal of transistor 44 is coupled to ground through a parallel combination of capacitor 50 and Zener diode 48. A drain terminal of transistor 44 is coupled to ground through a capacitor 46, and is also coupled to an input terminal 2 of the step-down voltage regular 52. Terminal 4 of the step-down voltage regulator 52 is coupled to ground, and boost terminal 3 of the step-down voltage regulator 52 is coupled through capacitor 54 to switch output terminal 1 of the step-down voltage regulator 52. Switch output terminal 1 of the step-down voltage regulator 52 is coupled to ground through Zener diode 56, and provides a 12V output voltage 74 through a series connection with inductor 58.

The 12V output voltage 74 is coupled to ground through capacitor 60, and capacitor 60 is also coupled to a feedback terminal 6 of the step-down voltage regulator 52. The input voltage terminal 8 of the DC-to-DC voltage converter 68 is coupled to ground through a parallel combination of capacitor 66 and Zener diode 64, and is also coupled to the 12V voltage output 74 through resistor 62. The capacitor 70 is connected across a positive capacitor terminal 2 and a negative capacitor terminal 4 of the DC-to-DC voltage converter 68. An output voltage terminal 5 of the DC-to-DC voltage converter 68 is coupled to ground through capacitor 72, and provides a negative 10V output voltage 76. The step-down voltage regulator 52 may be implemented using part number LM2670 from Texas Instruments, P.O. Box 655303, Dallas, Tex. 75265. The DC-to-DC voltage converter 68 may be implemented using part number TC7662B, which is available from Microchip Technology Inc., 2355 West Chandler Boulevard, Chandler, Ariz. 85224. The insulated gate bipolar transistor device 44 and its associated components, including capacitor 46, resistor 47, diode 48, and capacitor 50, form a pre-regulation circuit that converts the input voltage 12 to a fixed, rectified approximately 40V output following the bridge rectifier 14. This 40V output is applied to step-down voltage regulator 52, which is a high efficiency 3A step down regulator (Buck converter), the output of which is 12 VDC. This 12 VDC output is used to provide power to the current control device 10. Thus, the pre-regulation circuit steps the input voltage 12 down to approximately 40V, and this 40V output is then stepped down to 12 VDC to power the current control device 10. The insulated gate bipolar transistor 44 cannot directly accept the high input voltage 12 levels, and thus the pre-regulation circuit, which includes the insulated gate bipolar transistor device 44, capacitor 46, resistor 47, diode 48, and capacitor 50, is used to enable high AC and DC voltages to be used at this interface.

A voltage set signal at terminal 10 of connector 78, a voltage sense signal at terminal 9, and a gain input signal at terminal 7 of connector 78 are provided as inputs to the summer/operational loop gain amplifier 40, 24. The summer/operational loop gain amplifier 40, 24 includes operational amplifiers 82, 106, 132; potentiometers 90, 114; resistors 80, 92, 94, 100, 102, 104, 116, 118, 122, 126, and 128; capacitors 96, 112, 120, 140, 124; and diode 98. The voltage set signal is applied to a non-inverting terminal of operational amplifier 82 through resistor 80, and is coupled to a wiper terminal of potentiometer 90. The positive supply voltage for each of the operational amplifiers 82, 106, 132 is provided by the 12V output voltage 74, and the negative supply voltage for each of the operational amplifiers 82, 106, 132 is supplied by the negative 10V output voltage 76.

The voltage gain input signal at terminal 7 of connector 78 is provided to the non-inverting terminal of operational amplifier 106, which is coupled to ground through capacitor 112, and the voltage gain input signal is coupled to the voltage sense input signal at terminal 9 of connector 78 through resistor 104. The inverting terminal of operational amplifier 106 is coupled to ground through resistor 116, and is coupled to the output terminal of operational amplifier 106 through potentiometer 114. The wiper terminal of potentiometer 114 is coupled to the output terminal of operational amplifier 106, which is coupled to the inverting terminal of operational amplifier 82 through resistor 102, as well as ground through a series combination of resistors 100, 122. The inverting terminal of operational amplifier 82 is coupled to the output terminal of operational amplifier 82 through the parallel combination of resistor 94, capacitor 96 and diode 98. The output terminal of operational amplifier 82 is provided to the pulse width modulation voltage output terminal 4 of connector 78. The output of the bridge rectifier 14 is also provided to the inverting terminal of operational amplifier 82 through the series combination of resistors 100, 118, as well as the non-inverting terminal of operational amplifier 132 through resistor 126. The non-inverting terminal of operational amplifier 132 is coupled to ground through the parallel combination of resistor 138 and capacitor 140, and is coupled to the output terminal of operational amplifier 132 through resistor 128. The inverting terminal of operational amplifier 132 is connected to a 5.1V voltage reference 136. The operational amplifiers 82, 106, 132 may be implemented using part number LM148J, which is commercially available from Texas Instruments, P.O. Box 655303, Dallas, Tex. 75265.

Operational amplifiers 106, 82 and the associated components, which include resistor 104, capacitor 112, resistor 116, potentiometer 114, resistor 100, resistor 102, diode 98, capacitor 96, resistor 94, resistor 92, potentiometer 90, form a loop gain amplifier with a summing junction. This loop gain amplifier compares the coil current to a fixed value provided by potentiometers 90, 114 adjustments, and develops an error voltage that drives the pulse width modulator 142. The pulse width modulator 142 develops the voltage to the DC solenoid coil that sets and maintains the reduced current level. Operational amplifier 132 and its associated circuitry provides syncing levels used when the current control device 10 is powered from an AC input voltage 12. For a DC input voltage 12, the operational amplifier 132 is not required. NOR gates 146, 148 are included in the fault detection circuitry, which enables the current control device to enter bypass or shutdown mode depending on the type of failure.

The output terminal of operational amplifier 82 is provided to the pulse width modulation controller 26, which includes a voltage mode pulse width modulator 142, Zener diode 144, NOR gates 146, 148, diode 150, capacitors 152, 154, 156, 158, and resistors 160, 162, 164. The output terminal of the operational amplifier is provided to a non-inverting input pin 2 of the pulse width modulator 142, which is coupled to the output terminal of operational amplifier 132 through capacitor 124, and is also coupled to ground through Zener diode 144. The reset pin 1 and the comparator input pin 9 of the pulse width modulator 142 are coupled together, and are also coupled to ground through capacitor 158. The discharge pin 7 is coupled to the clock pin 5 of the pulse width modulator 142 through resistor 160, and the clock pin 5 is coupled to ground through capacitor 152. The reference voltage pin 16 of the pulse width modulator 142 is coupled to the 5.1V reference voltage 136, and the supply voltage pin 15 is coupled to the 12V voltage source 74. The reference voltage pin 16 is coupled to the collector supply voltage pin 13 through resistor 164, and is also coupled to ground through capacitor 154. The output B pin 14, output A pin 11, and output pin 3 of a timer 166 are provided as inputs to NOR gate 146, the output of which is provided as inputs to NOR gate 148 with a shutdown pin 10 of the pulse width modulator 142. The output of NOR gate 148 is provided as an input to diode 150, the output of which is provided to the low-side switching DC solenoid coil power driver 32. The pulse width modulator 142 may be implemented using part number SG3525, which is commercially available from ST Microelectronics, 7033 East Greenway Parkway, Scottsdale, Ariz. 85254. The pulse width modulator 142 is driven by a voltage applied to pin 2 of the pulse width modulator 142. The voltage to pin 2 of the pulse width modulator 142 is the output of the loop gain/summer amplifier, which includes operational amplifiers 106, 82. The output of the pulse width modulator 142 is a pulse width modulated square wave, which is a combination of outputs from pins 14, 11 of the pulse width modulator 142.

The low-side switching DC solenoid coil power driver 32 includes a bridge rectifier 168; metal oxide semi-conductor field effect transistors (MOSFET) 170, 172; silicon controlled rectifier (SCR) 174; resistors 176, 178, 180, 182, 184, 186, 194, 200, 204, 208; capacitors 188, 190, 208, transistor 192; Zener diode 196; and diode 198. The output of diode 150 is coupled to a gate terminal of MOSFET 170 through a series combination of resistors 176, 178, and status/fault indicator 202 through a series combination of capacitor 204, Zener diode 196, and diode 198. The output of terminal 1 of the bridge rectifier 14 is provided to terminal 3 of the SCR 174 through resistor 186, and terminal 1 of the SCR 174 is coupled to a node between resistors 176, 178. The control terminal 2 of SCR 174 is coupled to the output terminal 1 of bridge rectifier 14 through a series combination of resistors 184, 204.

The source and drain terminals of MOSFET 170 are coupled in parallel with the source and drain terminals of MOSFET 172. The source terminals of MOSFETs 170, 172 are coupled to terminal 3 of bridge rectifier 168, and the drain terminals of MOSFET 170, 172 are coupled to ground through a parallel combination of capacitors 188, 190, and resistor 180. A gate terminal of MOSFET 172 is coupled to Zener diode 196 through resistor 182. An emitter of transistor 192 is coupled to ground, a collector of transistor 192 is coupled to the output pin 1 of bridge rectifier 14 through resistor 204, and the base of transistor 192 is coupled to the parallel combination of capacitor 206 and resistor 208. MOSFETS 170, 172 may be implemented using part number FCH47N60NF, which is commercially available from Fairchild Semiconductor, 125 Crestwood Road, Mountaintop, Pa. 18707. Power Driver MOSFETS 170, 172 include a low-side switching circuit typology, with redundancy, which switches the DC solenoid coil to ground through sense resistor 180. The DC solenoid coil is switched to ground by the pulse width modulation controller 26 through logic circuitry 146, 148. The bridge rectifier 168 is connected to the common drain pins of MOSFETS 170, 172, and functions as a back EMF protection device for the DC solenoid coil. Transistor 192 and SCR 174 form an override bypass circuitry that provides the override bypass mode described above. In normal no-fault operation, transistor 192 is driven to an on state by logic circuitry 248, 250, 258, which grounds resistor 204 and prevents SCR 174 from conducting and turning on MOSFETS 170, 172. If a FAULT condition is detected by the logic circuitry, 248, 250, 258, transistor 192 will be driven to an off state, thereby allowing resistor 204 to latch SCR 174 to an on state. With SCR 174 in the on state, the power driver MOSFETS 170, 172 conduct full current to the DC solenoid coil in the bypass mode. The bypass mode is a latched function and can only be reset by removing and then reapplying power to the current control device 10.

The voltage sense signal on pin 9 of connector 78 is provided to a non-inverting input pin 11 of comparator 210 in the coil overcurrent fault detection circuit 34, which also includes a transistor 212; diode 214; resistors 216, 218, 220, 222, 224; and capacitor 226. An overcurrent test signal on pin 2 of connector 78 is provided to the inverting terminal of comparator 210, which is also connected to the 5.1V voltage reference source 136 through resistor 218, as well as ground through resistor 222. An output terminal of comparator 210 is coupled to the base of transistor 212, and a collector of transistor 212 through resistor 224. The collector of transistor 212 is coupled to the 12V power source 74, and the emitter of transistor 212 is coupled to the non-inverting terminal of comparator 210 through the series combination of diode 214 and resistor 216. The comparator 210 may be implemented using part number LM2901BN, which is commercially available from Texas Instruments, P.O. Box 655303, Dallas, Tex. 75265. The coil overcurrent fault detection circuit 32 includes a latching comparator circuit, which compares the voltage equivalent of DC solenoid coil current applied thru resistor 220 to the positive terminal of comparator 210 and the voltage equivalent of 5 A set by resistors 218, 222 to the negative terminal of comparator 210. If the voltage at the positive terminal of comparator 210 exceeds the voltage at the negative terminal of comparator 210, the output of comparator 210 latches a high voltage level using transistor 212, which indicates an overcurrent condition to the bypass circuitry that follows the transistor 212.

The full current override fault logic detection circuitry 18 includes comparators 228, 230, 232, 234; diodes 238, 240, 242, 244, 246, 256; NAND gates 248, 250, 252, 254; NOR gate 258; FETs 260, 262; capacitors 264, 266, 268, 270, 272, 310, 312, 314; resistors 274, 276, 278, 280, 282, 284, 286, 288, 290, 292, 294, 296, 300, 302, 304, 306, 308, 316; and potentiometer 298. The voltage sense signal at pin 9 of connector 78 is provided to the non-inverting terminal of comparator 228 through the resistor 282 and is coupled to the output terminal of comparator 228 through a series combination of resistor 280 and diode 240. The current test signal at pin 5 of connector 78 is provided to the inverting terminal of comparator 228, which is coupled to the voltage set pin 10 of connector 78 through a series combination of resistors 80, 284. The inverting terminal of comparator 228 is coupled to the non-inverting terminal of comparator 232 through resistor 286, and the output terminal of comparator 228 through the series combination of capacitor 266 and resistor 278.

The voltage set signal at pin 10 of connector 78 is coupled to the non-inverting input terminal of comparator 232 through the series combination of resistors 80, 284, 286, and the inverting terminal of comparator 232 is coupled to ground through capacitor 270, as well as the non-inverting terminal of comparator 234. The inverting terminal of comparator 234 is coupled to the wiper terminal of potentiometer 298, and the output terminal of comparator 234 is coupled to the 12V power source 74 through a series combination of diode 244 and resistor 276. The output terminal of comparator 232 is coupled to the base of transistor 262 through diode 242, which is also coupled to the inverting terminal of comparator 228 through the series combination of capacitor 266, resistor 278, and diode 256. The source of transistor 262 is coupled to the 12V power source 74, and the drain of transistor 262 is coupled to the fault/status indicator 202 through resistor 302. The output pin 3 of the timer 166 is coupled to the fault/status indicator 202 through resistor 300.

The gate of transistor 262 and the output terminal of comparator 228 are provided as inputs to the NAND gate 248, the output of which is provided as inputs to NAND gate 254. The output of NAND gate 254, the emitter of transistor 212, and the output pin 3 of timer 166, via diode 246, are coupled as inputs to the NOR gate 258, the output of which is provided as inputs to NAND gate 250. The output of NAND gate 250 is provided to the parallel combination of capacitor 206 and resistor 208. The reset pin 4 of timer 166 is coupled to the 12V power source 74 through resistor 308. The discharge pin 7 and threshold pin 6 of timer 166 are coupled to the 12V power source 74 through resistor 306, and to ground through capacitor 312. The trigger pin 2 of timer 166 is coupled to the 12V power source 74 through resistor 304, and ground through capacitor 310. The control voltage pin 5 of timer 166 is coupled to ground through capacitor 314. A green indicator at pin 2 of fault/status indicator 202 is coupled to the 12V power source 74 through a series combination of Zener diode 316 and resistor 318, and a blinking pin 3 of fault/status indicator 202 is coupled to ground through resistor 320. The blinking pin 6 is coupled to ground through resistor 322. The timer 166 may be implemented using part number LM555CN which is commercially available from Texas Instruments, P.O. Box 655303, Dallas, Tex. 75265. The override fault logic detection circuitry 18 includes three (3) sub-circuits: a blinking oscillator circuit (which includes operational amplifier 230, NAND gate 252, FET 260 and associated components); a window comparator circuit (which includes comparators 232, 234 and associated components); and logic circuitry (which includes NAND gate 248, NOR gate 25, and NAND gate 250). The blinking oscillator is enabled when an overcurrent condition is detected and alerts the operator of this condition using a front panel indicator. The window detector circuitry is described in Table 1. The logic gate circuitry determines the proper course of action that the current control device 10 is to take based on whether the fault condition is an overcurrent condition or a failure of another type, such as an open or shorted coil, the wrong coil, or the like. The DC solenoid coil (not shown in FIGS. 2A-C) is external to the current control device 10 and is connected to pins 3 and 4 of connector 42.

Figure 4:
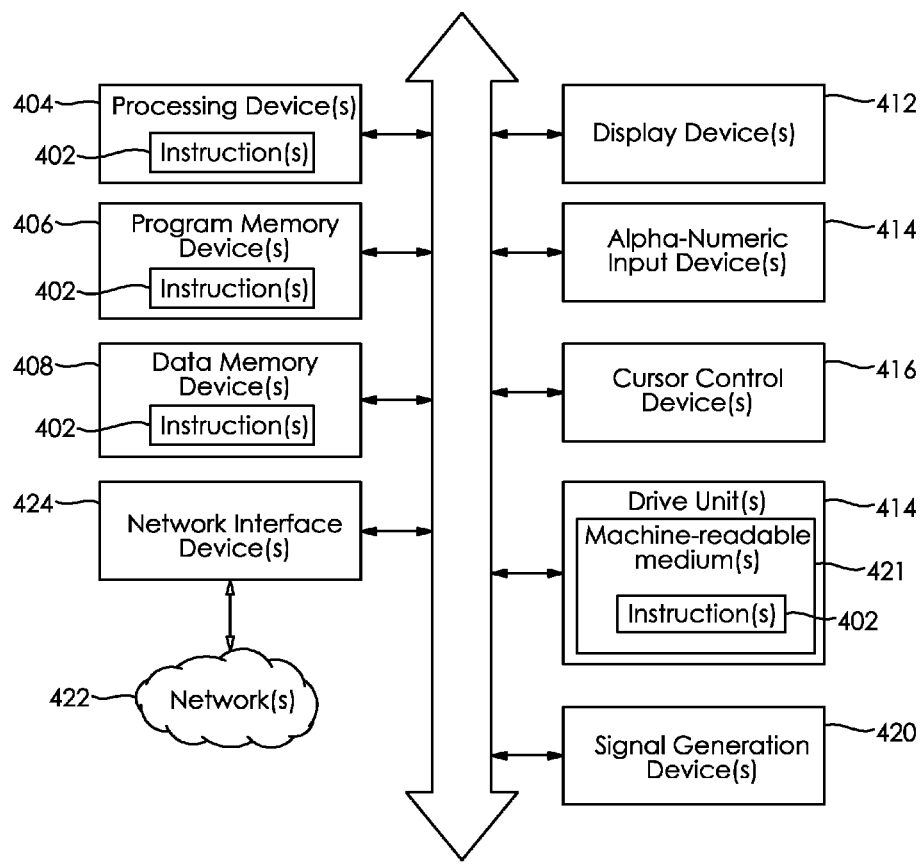
FIG. 4 is a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 4 is a block diagram of an embodiment of a machine in the form of a computing system 400, within which is a set of instructions 402 that, when executed, cause the machine to perform any one or more of the methodologies according to embodiments of the invention. In one or more embodiments, the machine operates as a standalone device; in one or more other embodiments, the machine is connected (e.g., via a network 422) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 400 includes a processing device(s) 404 (e.g., a central processing unit (CPU), a graphics processing unit (GPU), or both), program memory device(s) 406, and data memory device(s) 408, which communicate with each other via a bus 410. The computing system 400 further includes display device(s) 412 (e.g., liquid crystal display (LCD), flat panel, solid state display, or cathode ray tube (CRT)). The computing system 400 includes input device(s) 414 (e.g., a keyboard), cursor control device(s) 416 (e.g., a mouse), disk drive unit(s) 418, signal generation device(s) 420 (e.g., a speaker or remote control), and network interface device(s) 424, operatively coupled together, and/or with other functional blocks, via bus 410.

The disk drive unit(s) 418 includes machine-readable medium(s) 426, on which is stored one or more sets of instructions 402 (e.g., software) embodying any one or more of the methodologies or functions herein, including those methods illustrated herein. The instructions 402 may also reside, completely or at least partially, within the program memory device(s) 406, the data memory device(s) 408, and/or the processing device(s) 404 during execution thereof by the computing system 400. The program memory device(s) 406 and the processing device(s) 404 also constitute machine-readable media. Dedicated hardware implementations, such as but not limited to ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 412, input device(s) 414, cursor control device(s) 416, signal generation device(s) 420, etc., can be collectively referred to as an "input/output interface," and is intended to include one or more mechanisms for inputting data to the processing device(s) 404, and one or more mechanisms for providing results associated with the processing device(s). Input/output or I/O devices (including but not limited to keyboards (e.g., alpha-numeric input device(s) 414, display device(s) 412, and the like) can be coupled to the system either directly (such as via bus 410) or through intervening input/output controllers (omitted for clarity).

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

An integrated circuit in accordance with the embodiments of the present invention can be employed in essentially any application and/or electronic system in which buffers are utilized. Suitable systems for implementing one or more embodiments of the invention include, but are not limited to, personal computers, interface devices (e.g., interface networks, high-speed memory interfaces (e.g., DDR3, DDR4), etc.), data storage systems (e.g., RAID system), data servers, etc. Systems incorporating such integrated circuits are considered part of embodiments of the invention. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 402, or that which receives and executes instructions 402 from a propagated signal so that a device connected to a network environment 422 can send or receive voice, video or data, and to communicate over the network 422 using the instructions 402. The instructions 402 are further transmitted or received over the network 422 via the network interface device(s) 424. The machine-readable medium also contains a data structure for storing data useful in providing a functional relationship between the data and a machine or computer in an illustrative embodiment of the systems and methods herein.

While the machine-readable medium 402 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. A direct current (DC) solenoid coil current controller, which comprises:
   a rectifier, the rectifier configured to input an alternating current signal, the rectifier configured to input a direct current signal, the rectifier outputting a rectified signal using at least one of the alternating current signal and the direct current signal;
   a pulse width modulator, the pulse width modulator outputting a pulse width modulated signal in response to the rectified signal;
   a power driver, the power driver configured to control a DC solenoid coil using the pulse width modulated signal, thereby enabling the DC solenoid coil to be controlled in response to the alternating current signal; and
   fault detection circuitry, the fault detection circuitry configured to detect at least one of a failure to energize the DC solenoid coil to an expected full current value, loss of current control, incorrect DC solenoid coil connected to the DC solenoid coil current controller, shorted DC solenoid coil winding, and loss of power.

2. The DC solenoid coil current controller, as defined by claim 1, further comprising pre-regulation circuitry, the pre-regulation circuitry configured to input the rectified signal, the rectified signal comprising a first voltage, the pre-regulation circuitry converting the rectified signal to a pre-regulated signal, the pre-regulated signal comprising a second voltage, the first voltage being greater than the second voltage.

3. The DC solenoid coil current controller, as defined by claim 2, further comprising voltage regulation circuitry, the voltage regulation circuitry configured to input the pre-regulated signal, the voltage regulation circuitry converting the pre-regulated signal to a regulated signal, the regulated signal comprising a third voltage, the second voltage being greater than the third voltage.

4. The DC solenoid coil current controller, as defined by claim 2, wherein the pre-regulation circuitry further comprises at least one of an insulated gate bipolar transistor, a diode, a resistor, and a capacitor.

5. The DC solenoid coil current controller, as defined by claim 1, wherein the alternating current signal comprises a voltage range of 80-135 VAC.

6. The DC solenoid coil current controller, as defined by claim 1, wherein the direct current signal comprises a voltage range of 90-140 VDC.

7. The DC solenoid coil current controller, as defined by claim 2, wherein the pre-regulated signal comprises a voltage of 40V.

8. The DC solenoid coil current controller, as defined by claim 3, wherein the regulated signal comprises a voltage of 12 VDC.

9. A method of controlling current to a DC solenoid coil, the method comprising:
inputting an alternating current signal and a direct current signal;
rectifying at least one of the alternating current signal and the direct current signal to provide a rectified signal;
providing a pulse width modulated signal in response to the rectified signal;
controlling a DC solenoid coil using the pulse width modulated signal, thereby enabling a direct current DC solenoid coil to be controlled in response to the alternating current signal; and
detecting at least one of a failure to energize the DC solenoid coil to an expected full current value, loss of current control, incorrect DC solenoid coil connected to the DC solenoid coil current controller, shorted DC solenoid coil winding, and loss of power.

10. The method of controlling current to a DC solenoid coil, as defined by claim 9, further comprising converting the rectified signal to a pre-regulated signal, the rectified signal comprising a first voltage, the pre-regulated signal comprising a second voltage, the first voltage being greater than the second voltage.

11. The method of controlling current to a DC solenoid coil, as defined by claim 10, further comprising converting the pre-regulated signal to a regulated signal, the regulated signal comprising a third voltage, the second voltage being greater than the third voltage.

12. The method of controlling current to a DC solenoid coil, as defined by claim 9, wherein the alternating current signal comprises a voltage range of 80-135 VAC.

13. The method of controlling current to a DC solenoid coil, as defined by claim 9, wherein the direct current signal comprises a voltage range of 90-140 VDC.

14. The method of controlling current to a DC solenoid coil, as defined by claim 10, wherein the pre-regulated signal comprises a voltage of 40V.

15. The method of controlling current to a DC solenoid coil, as defined by claim 11, wherein the regulated signal comprises a voltage of 12 VDC.

16. The DC solenoid coil controller, as defined by claim 1, wherein the DC solenoid coil controller monitors a solenoid control parameter and provides corrective action for at least one of a detected anomaly and operational fault.

17. The DC solenoid coil controller, as defined by claim 1, wherein the DC solenoid coil controller provides an override bypass mode, a full input voltage of the DC solenoid coil controller being applied to the DC solenoid coil without current feedback control in the override bypass mode.

18. The DC solenoid coil controller, as defined by claim 1, wherein the DC solenoid coil controller provides an output shutdown mode, an output of the DC solenoid coil controller to the DC solenoid coil being turned off to prevent failure of the DC solenoid coil controller and overheating of the DC solenoid coil in the output shutdown mode.

19. The method of controlling current to a DC solenoid coil, as defined by claim 9, further comprising:
monitoring a solenoid control parameter; and
providing corrective action for at least one of a detected anomaly and operational fault.

20. The method of controlling current to a DC solenoid coil, as defined by claim 9, further comprising applying a full input voltage of the DC solenoid coil controller to the DC solenoid coil without current feedback control in an override bypass mode.

21. The method of controlling current to a DC solenoid coil, as defined by claim 9, further comprising turning off an output of the DC solenoid coil controller to the DC solenoid coil to prevent failure of the DC solenoid coil controller and overheating of the DC solenoid coil in an output shutdown mode.

* * * * *